Figure 1:
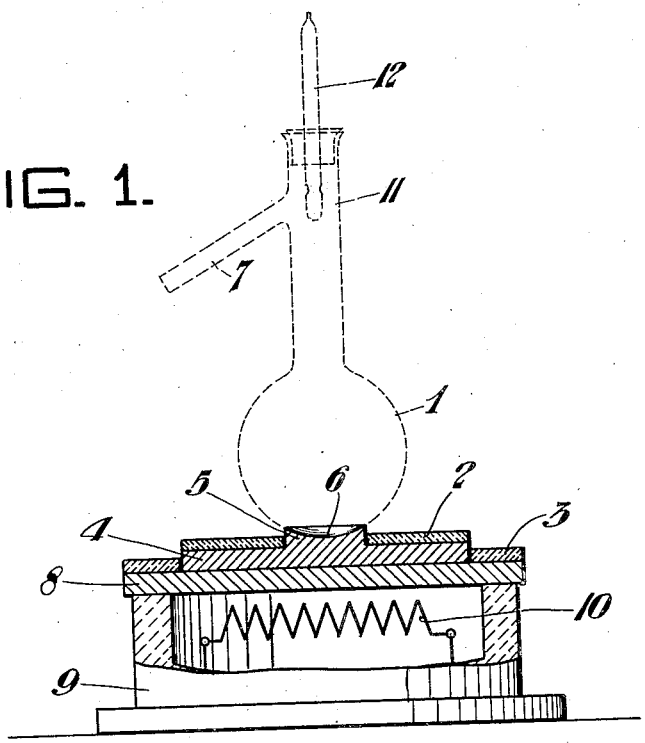
Figure 2:
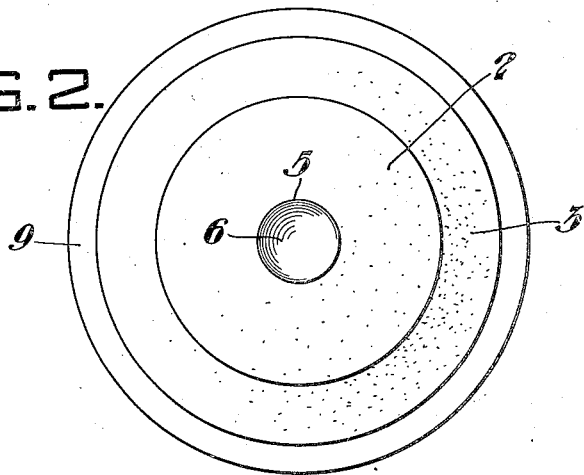

July 28, 1942.  A. L. TANNEHILL  2,291,421
SAFETY APPARATUS FOR HEATING INFLAMMABLE LIQUIDS BY
CONDUCTION AT NONIGNITING TEMPERATURES
Filed June 27, 1941

Inventor:
ARTHUR L. TANNEHILL,
by: John E. Jackson
his Attorney.

Patented July 28, 1942

2,291,421

UNITED STATES PATENT OFFICE 2,291,421

SAFETY APPARATUS FOR HEATING INFLAMMABLE LIQUIDS BY CONDUCTION AT NONIGNITING TEMPERATURES

Arthur L. Tannehill, Gary, Ind.

Application June 27, 1941, Serial No. 400,142

4 Claims. (Cl. 202—232)

This invention relates to an apparatus for heating, boiling, evaporating or distilling liquids, and more especially for distilling volatile inflammable liquids.

One object of the invention is to provide a means whereby the risk of fire attendant on heating, evaporating or distilling inflammable liquids is avoided. As an illustrative example of the application of the method and apparatus, it may be used in making distillation tests on inflammable liquids, such as gasoline and benzol, without risk of fire.

The distillation test is generally made in a manner similar to the method of the American Society Testing Materials designation D 86—35, described in part II, page 870, American Society Testing Materials Standards—1936. This method involves boiling a sample of 100 milliliters of the inflammable liquid in a spherical glass flask over an open flame or over an electrical heating element which is of sufficiently high temperature to ignite or kindle the vapors. In case of a spill of the liquid through breakage of the flask, or other reason, the person conducting the test is in serious danger. Fatal accidents have resulted from this method of testing. It is highly desirable, therefore, to employ a means and method of heating which will minimize or eliminate this hazard.

When making the test in accordance with the prior art teaching, the spherical flask is placed on an asbestos board having a round hole about 1¼" in diameter, into which the flask is fitted. The flame or other source of heat is placed below the board, and only a small portion of the area of the flask at the bottom is exposed to the heat. The purpose of this arrangement is to avoid superheating the vapors of the boiling liquid. Since the direct heating area is restricted, the rate of distillation prescribed has necessitated a high temperature source of heat, whether the heat was supplied through convection by the hot gases from a flame or through the radiation of an electrically heated coil.

The apparatus and method of my invention supplies the heat at a sufficient rate primarily through conduction alone (in contra-distinction to radiation and convection) from a sufficient conductive area of a hot plate, directly to the flask, the temperature of the hot plate being well below the ignition temperature of nearly all inflammable liquids, carbon bisulphide being the only known exception.

Heretofore, hot plates used for boiling liquids have been flat throughout. Such plates are not suitable for the purpose of making distillation tests, because the area of contact between a spherical flask and a flat heating plate is excessively small, and a sufficient amount and rate of heat transfer to effect the required distilling rate, in these prior art devices, cannot be obtained when the flat plate is at a temperature below the ignition temperature.

I have found that by making the heating plate of a dished or concave form so that a sufficient area of the heating plate conforms to the outer convex contour of the flask, heat is uniformly transferred by conduction only, directly to the flask at any desired rate over a well-defined area, while maintaining the temperature of the conductive heating plate and all exposed parts of the apparatus, below the ignition or kindling temperature of the inflammable liquid. The fire or explosion hazard is therefore eliminated. I have also found that any prescribed distillation rate can be uniformly maintained, with more ease and certainty than by any other means of heating. I have further found that the superheating of the vapors can be avoided by control of the area, by restricting the diameter of the dished portion of the plate which is in heat conductive relation with the flask, and by screening that portion of the flask above and out of direct heat conductive relation with the heating plate, from the radiant heat or heat by conduction from other portions of the hot plate not in direct heat conductive relation with the flask. A suitable apparatus for the practice of the method of my invention might be constructed in a number of ways and of various materials. An apparatus and method which I have found highly satisfactory is illustrated in the drawing.

Referring to the drawing, a dished or concave seat 6 is provided on the raised portion 5 of the hot plate 4 on which the flask 1 rests. The lower portion of the flask 1 is of a general spherical form. For use on benzol, toluol, xylol, etc. (the chemical names used to designate corresponding pure compounds are benzene, toluene, xylene, etc.), the dished or concave portion 5 of the hot plate is 1½ inches in diameter and the radius of curvature of the dished or concaved recess 6 is 1½ inches, which is the same as the convex seat of the flask 1, since the flask is 3 inches in diameter. The lower body portion of the hot plate 4 is 4 inches in diameter and ⅜ inch thick at the sides. The raised portion 5 in the center of the hot plate 4, which carries the dish-like or concave seat 6, extends ½

conductive contact relation to the flask, said area of conductive contact relation depending upon the particular liquid and the rate of volatilization and distillation desired, the temperature of said conductive medium at the seat being below the ignition point of the volatile gases, said heat conductive medium having a base area substantially larger than said seat area on the upper side and being composed of brass or other medium having a heat conductivity of from about 0.1 to 0.25.

4. Safety and non-superheating distilling apparatus as defined in claim 3, said base being of an area in excess of the largest horizontal section of the flask, the seat-to-base area ratio being not less than 1 to 4 for brass, and heat insulating means interposed between the conductive medium and the flask excepting at the seat area where the flask is in heat conductive contact relation with the heat conductive medium, whereby the volatile gases in the flask are protected from being superheated and accidental contact by any spilled liquid with a heating source at a temperature at or above the flash or ignition point of the liquid is precluded.

ARTHUR L. TANNEHILL.